3,258,485
PROCESS FOR THE PREPARATION
OF CARBOHYDRAZIDE
Christopher S. Argyle, Loughborough, England, assignor to Whiffen & Sons Limited, Loughborough, England
No Drawing. Filed Dec. 16, 1963, Ser. No. 330,580
Claims priority, application Great Britain, Dec. 22, 1962, 48,537/62
5 Claims. (Cl. 260—554)

The present invention relates to a process for the preparation of carbohydrazide.

Carbohydrazide is a well-known substance and has been prepared by the action of two moles of hydrazine on an organic carbonate such as diphenyl carbonate. Most unexpectedly it has now been found that carbohydrazide can be prepared in very high yields by the reaction of hydrazine with cyanuric acid.

Accordingly the present invention is for a process for the preparation of carbohydrazide which comprises reacting hydrazine with cyanuric acid and recovering the formed carbohydrazide.

Suitably the process of the present invention is carried out at an elevated temperature. Preferably the process of the present invention is carried out under reflux, that is at the boiling point of reaction mixture. The reaction can be carried out at lower temperatures but inevitably the rate of reaction is lower.

By carrying out the process of the present invention under moderate pressure even higher temperatures may be employed. For example, the pressure may be in the range 10–200 pounds per square inch gauge.

It is though that the reaction of hydrazine with cyanuric acid proceeds according to the equation:

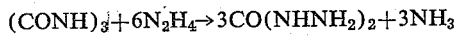

$$(CONH)_3 + 6N_2H_4 \rightarrow 3CO(NHNH_2)_2 + 3NH_3$$

It has been found most convenient to use aqueous hydrazine in the process of the present invention. The yield of carbohydrazide depends on the concentration and amount of hydrazine used and on the reaction time. The preferred concentration range of hydrazine is 25–50%. With lower concentrations reaction time becomes excessive and with higher concentrations, for example 64% hydrazine small amounts of 4-aminourazole are formed as a by-product with consequent reduction in yield of carbohydrazide.

Desirably an excess of hydrazine is employed in the process of the present invention. Preferably at least 10 moles (i.e. 4 moles excess) of hydrazine are used for every mole of cyanuric acid. Using a smaller excess the reaction is very slow. As large an excess of hydrazine as desired can be used, but obviously for economic reasons it is preferable to use as small an excess as possible, consistent with a reasonable reaction rate. In practice it has been found that the use of 15 moles of hydrazine per mole of cyanuric acid gives satisfactory results.

The duration of the reaction depends on the concentration and amount of hydrazine used. For example, using 15 moles of 40% hydrazine reaction was complete within 18–20 hours; with 10 moles of 40% hydrazine 100 hours were required for completion of the reaction.

The carbohydrazide may be recovered from the reaction mixture by any convenient method. For instance the reaction mixture may be evaporated to drive off water and unreacted hydrazine and the carbohydrazide precipitated by the addition of, for example, alcohol.

Carbohydrazide may be used, for example, as an antitarnishing agent.

The process for preparing carbohydrazide from hydrazine and cyanuric acid is illustrated in the following examples in which parts are by weight.

*Example*

A mixture of cyanuric acid (100 parts) and 100% hydrazine hydrate (1000 parts) was refluxed for 17 hours during which time ammonia was evolved and the acid dissolved. Three-quarters of the hydrate was distilled off and an equal amount of alcohol added to the stirred concentrate cooled in ice. Crystalline carbohydrazide (150 parts) precipitated. This is equivalent to a yield of 71.5% based on the cyanuric acid. The carbohydrazide was identified by the addition of benzaldehyde when the dibenzylidene derivative having a melting point 194° C. precipitated.

I claim:
1. A process for the preparation of carbohydrazide which comprises reacting hydrazine with cyanuric acid and recovering the carbohydrazide so formed.
2. A process for the preparation of carbohydrazide which comprises reacting hydrazine with cyanuric acid at the boiling point of the reaction mixture and recovering the carbohydrazide so formed.
3. A process for the preparation of carbohydrazide which comprises reacting an aqueous solution of hydrazine containing 25–50% by weight of hydrazine with cyanuric acid at the boiling point of the reaction mixture and recovering the carbohydrazide so formed.
4. A process for the preparation of carbohydrazide which comprises reacting an aqueous solution of hydrazine containing 25 to 50% by weight of hydrazine with cyanuric acid at the boiling point of the reaction mixture and recovering the carbohydrazide so formed, at least 10 moles of hydrazine being used for every mole of cyanuric acid.
5. A process for the preparation of carbohydrazide which comprises reacting an aqueous solution of hydrazine containing 25–50% weight of hydrazine with cyanuric acid at an elevated temperature and at a superatmospheric pressure and recovering the carbohydrazide so formed, at least 10 moles of hydrazine being used for every mole of cyanuric acid.

No references cited.

HENRY R. JILES, *Acting Primary Examiner.*

JOSEPH A. NARCAVAGE, *Assistant Examiner.*